(12) United States Patent
Huang et al.

(10) Patent No.: US 12,096,374 B2
(45) Date of Patent: Sep. 17, 2024

(54) PHYSICAL UPLINK SHARED CHANNEL TRANSMIT POWER CONFIGURATION

(71) Applicant: QUALCOMM Incorporated, San Diego, CA (US)

(72) Inventors: Min Huang, Beijing (CN); Chao Wei, Beijing (CN); Yuwei Ren, Beijing (CN); Yu Zhang, Beijing (CN); Qiaoyu Li, Beijing (CN); Chenxi Hao, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/593,112

(22) PCT Filed: Apr. 6, 2019

(86) PCT No.: PCT/CN2019/081636
§ 371 (c)(1),
(2) Date: Sep. 9, 2021

(87) PCT Pub. No.: WO2020/206573
PCT Pub. Date: Oct. 15, 2020

(65) Prior Publication Data
US 2022/0191800 A1    Jun. 16, 2022

(51) Int. Cl.
*H04W 52/14* (2009.01)
*H04W 52/08* (2009.01)
(Continued)

(52) U.S. Cl.
CPC ......... *H04W 52/146* (2013.01); *H04W 52/08* (2013.01); *H04W 52/10* (2013.01); *H04W 52/242* (2013.01)

(58) Field of Classification Search
CPC ... H04W 52/146; H04W 52/08; H04W 52/10; H04W 52/242; H04W 52/38;
(Continued)

(56) References Cited

U.S. PATENT DOCUMENTS 10,462,755 B2    10/2019  Akkarakaran et al.
2013/0107751 A1*  5/2013  Kiyoshima .......... H04W 52/242
                                                    370/252
(Continued)

FOREIGN PATENT DOCUMENTS

CN    107113156 A    8/2017
CN    107277908 A    10/2017
(Continued)

OTHER PUBLICATIONS

Supplementary European Search Report—EP19924250—Search Authority—Munich—Jan. 24, 2023.
(Continued)

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a wireless communication device may receive an indication of a first transmit power configuration and a second transmit power configuration for a physical uplink shared channel (PUSCH) communication. The wireless communication device may transmit, using a first transmit power that is based at least in part on the first transmit power configuration, a first portion of the PUSCH communication in a full-duplex portion of a time-frequency resource. The wireless communication device may transmit, using a second transmit power that is based at least in part on the second transmit power configuration, a second portion of the PUSCH communication in a (Continued)

non-full-duplex portion of the time-frequency resource. Numerous other aspects are provided.

36 Claims, 11 Drawing Sheets

(51) Int. Cl.
*H04W 52/10* (2009.01)
*H04W 52/24* (2009.01)

(58) Field of Classification Search
CPC ............ H04W 52/262; H04W 52/365; H04W 52/243; H04W 52/42; H04W 72/23; H04W 72/21; H04W 72/04; H04W 72/1268; H04W 72/0446; H04W 24/08; H04W 76/27; H04W 72/541; H04W 52/24; H04W 88/02; H04W 88/08; H04W 52/247; H04W 72/542; H04W 72/0473; H04W 52/04; H04W 52/248; H04W 74/006; H04W 52/245; H04W 72/232; H04W 72/231; H04W 52/367
See application file for complete search history.

(56) References Cited

U.S. PATENT DOCUMENTS

| | | | | |
|---|---|---|---|---|
| 2015/0085787 | A1* | 3/2015 | Ouchi | H04W 52/146 |
| | | | | 455/522 |
| 2015/0215874 | A1 | 7/2015 | Chen et al. | |
| 2016/0242125 | A1 | 8/2016 | Lee et al. | |
| 2017/0289918 | A1 | 10/2017 | Sun et al. | |
| 2017/0302337 | A1* | 10/2017 | Liu | H04L 5/14 |
| 2019/0357149 | A1* | 11/2019 | Zhang | H04W 52/146 |
| | | | | 455/522 |
| 2020/0037264 | A1* | 1/2020 | Ciccarelli | H04W 52/146 |
| 2020/0228196 | A1* | 7/2020 | Wilson | H04W 72/23 |
| 2020/0314770 | A1* | 10/2020 | Wu | H04W 52/367 |
| 2021/0250934 | A1* | 8/2021 | Zhao | H04W 52/383 |
| 2021/0298026 | A1* | 9/2021 | Abotabl | H04W 72/0446 |
| 2023/0319826 | A1* | 10/2023 | Ryu | H04W 72/542 |
| | | | | 370/329 |

FOREIGN PATENT DOCUMENTS

| | | | |
|---|---|---|---|
| EP | 3322118 A1 | | 5/2018 |
| EP | 3443782 A1 | | 2/2019 |
| KR | 20190031982 A | * | 3/2019 |
| WO | 2015116503 A1 | | 8/2015 |
| WO | WO-2018232127 A1 | | 12/2018 |
| WO | WO-2019046960 A1 | | 3/2019 |

OTHER PUBLICATIONS

Supplementary Partial European Search Report—EP19924250—Search Authority—The Hague—Oct. 17, 2022.
3GPP TS 38.213: "3rd Generation Partnership Project, Technical Specification Group Radio Access Network, NR, Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, Retrieved from the Internet: URL: http://www.3gpp.org/ftp/3guInternal/3GPP%5Fultimate%5Fversions%5Fto%5Fbe%5Ftransposed/sentToDpc/38213%2Df50%2Ezip [retrieved on Mar. 27, 2019] p. 12-p. 74, section 7.3.1.
International Search Report and Written Opinion—PCT/CN2019/081636—ISA/EPO—Jan. 2, 2020.
Samsung 3GPP TSG-RAN1 Meeting #92bis, R1-1805776 Draft CR to TS 38.213 capturing the RAN1#92bis Meeting Agreements Apr. 20, 2018, 91 pages, sections 4-13.

* cited by examiner

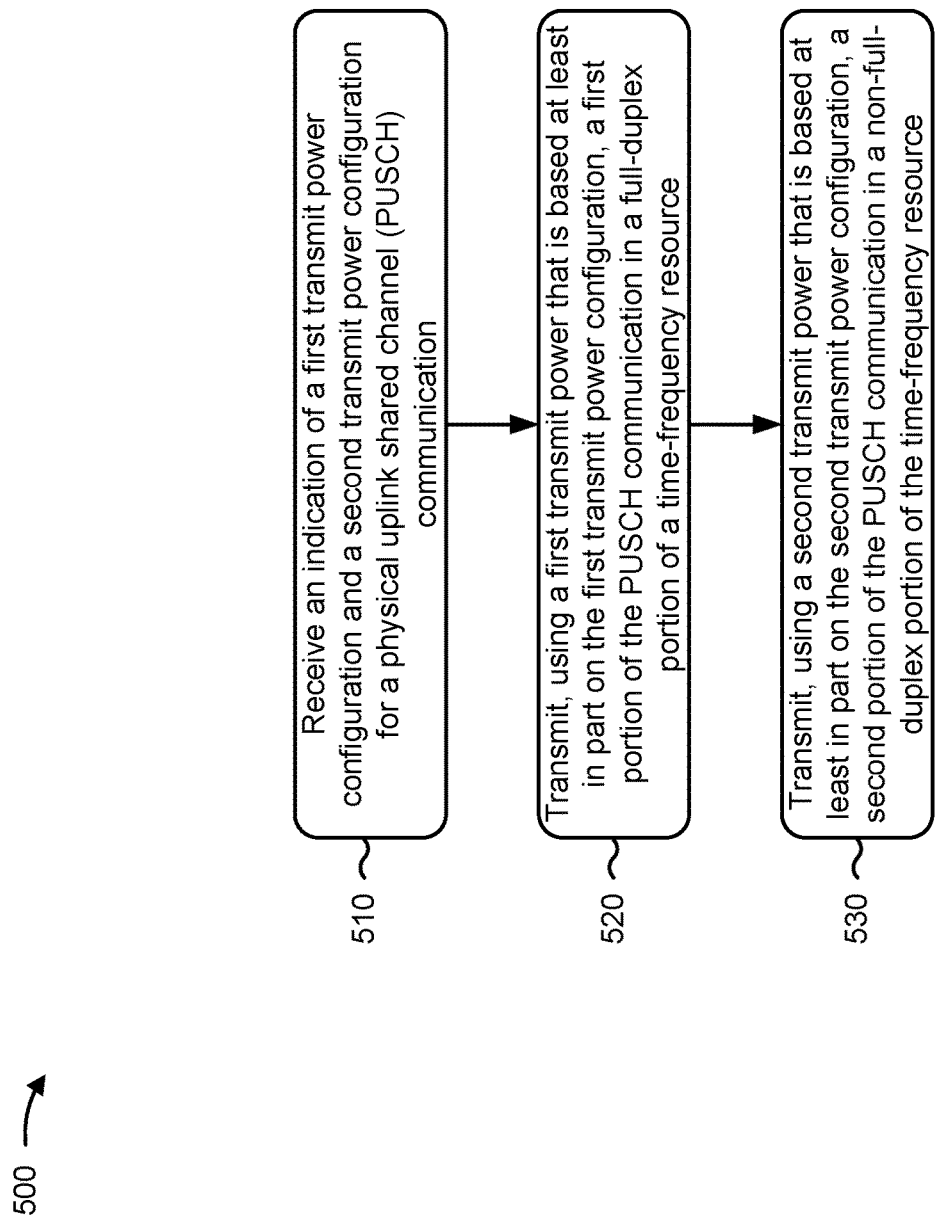

PHYSICAL UPLINK SHARED CHANNEL TRANSMIT POWER CONFIGURATION

CROSS-REFERENCE TO RELATED APPLICATION

This application is a 371 national stage of Patent Cooperation Treaty (PCT) Application No. PCT/CN2019/081636 filed on Apr. 6, 2019, entitled "PHYSICAL UPLINK SHARED CHANNEL TRANSMIT POWER CONFIGURATION," which is hereby expressly incorporated by reference herein.

FIELD OF THE DISCLOSURE

Aspects of the present disclosure generally relate to wireless communication, and to techniques and apparatuses for physical uplink shared channel (PUSCH) transmit power configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a wireless communication device, may include receiving an indication of a first transmit power configuration and a second transmit power configuration for a physical uplink shared channel (PUSCH) communication; transmitting, using a first transmit power that is based at least in part on the first transmit power configuration, a first portion of the PUSCH communication in a full-duplex portion of a time-frequency resource; and transmitting, using a second transmit power that is based at least in part on the second transmit power configuration, a second portion of the PUSCH communication in a non-full-duplex portion of the time-frequency resource.

In some aspects, a wireless communication device for wireless communication may include memory and one or more processors operatively coupled to the memory. The memory and the one or more processors may be configured to receive an indication of a first transmit power configuration and a second transmit power configuration for a PUSCH communication; transmit, using a first transmit power that is based at least in part on the first transmit power configuration, a first portion of the PUSCH communication in a full-duplex portion of a time-frequency resource; and transmit, using a second transmit power that is based at least in part on the second transmit power configuration, a second portion of the PUSCH communication in a non-full-duplex portion of the time-frequency resource.

In some aspects, a non-transitory computer-readable medium may store one or more instructions for wireless communication. The one or more instructions, when executed by one or more processors of a wireless communication device, may cause the one or more processors to receive an indication of a first transmit power configuration and a second transmit power configuration for a PUSCH communication; transmit, using a first transmit power that is based at least in part on the first transmit power configuration, a first portion of the PUSCH communication in a full-duplex portion of a time-frequency resource; and transmit, using a second transmit power that is based at least in part on the second transmit power configuration, a second portion of the PUSCH communication in a non-full-duplex portion of the time-frequency resource.

In some aspects, an apparatus for wireless communication may include means for receiving an indication of a first transmit power configuration and a second transmit power configuration for a PUSCH communication; means for transmitting, using a first transmit power that is based at least in part on the first transmit power configuration, a first portion of the PUSCH communication in a full-duplex portion of a time-frequency resource; and means for transmitting, using a second transmit power that is based at least in part on the second transmit power configuration, a second portion of the PUSCH communication in a non-full-duplex portion of the time-frequency resource.

In some aspects, a method of wireless communication, performed by a base station (BS), may include transmitting an indication of a first transmit power configuration and a second transmit power configuration for a PUSCH communication; receiving a first portion of the PUSCH communication that is transmitted in a full-duplex portion of a time-frequency resource and at a first transmit power that is based at least in part on the first transmit power configuration; and receiving a second portion of the PUSCH communication that is transmitted in a non-full-duplex portion of the time-frequency resource and at a second transmit power that is based at least in part on the second transmit power configuration.

In some aspects, a BS for wireless communication may include memory and one or more processors operatively coupled to the memory. The memory and the one or more processors may be configured to transmit an indication of a first transmit power configuration and a second transmit power configuration for a PUSCH communication; receive a first portion of the PUSCH communication that is transmitted in a full-duplex portion of a time-frequency resource and at a first transmit power that is based at least in part on the first transmit power configuration; and receive a second portion of the PUSCH communication that is transmitted in a non-full-duplex portion of the time-frequency resource and at a second transmit power that is based at least in part on the second transmit power configuration.

In some aspects, a non-transitory computer-readable medium may store one or more instructions for wireless communication. The one or more instructions, when executed by one or more processors of a BS, may cause the one or more processors to: transmit an indication of a first transmit power configuration and a second transmit power configuration for a PUSCH communication; receive a first portion of the PUSCH communication that is transmitted in a full-duplex portion of a time-frequency resource and at a first transmit power that is based at least in part on the first transmit power configuration; and receive a second portion of the PUSCH communication that is transmitted in a non-full-duplex portion of the time-frequency resource and at a second transmit power that is based at least in part on the second transmit power configuration.

In some aspects, an apparatus for wireless communication may include means for transmitting an indication of a first transmit power configuration and a second transmit power configuration for a PUSCH communication; means for receiving a first portion of the PUSCH communication that is transmitted in a full-duplex portion of a time-frequency resource and at a first transmit power that is based at least in part on the first transmit power configuration; and means for receiving a second portion of the PUSCH communication that is transmitted in a non-full-duplex portion of the time-frequency resource and at a second transmit power that is based at least in part on the second transmit power configuration.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a user equipment (UE), in accordance with various aspects of the present disclosure.

Figure 1:
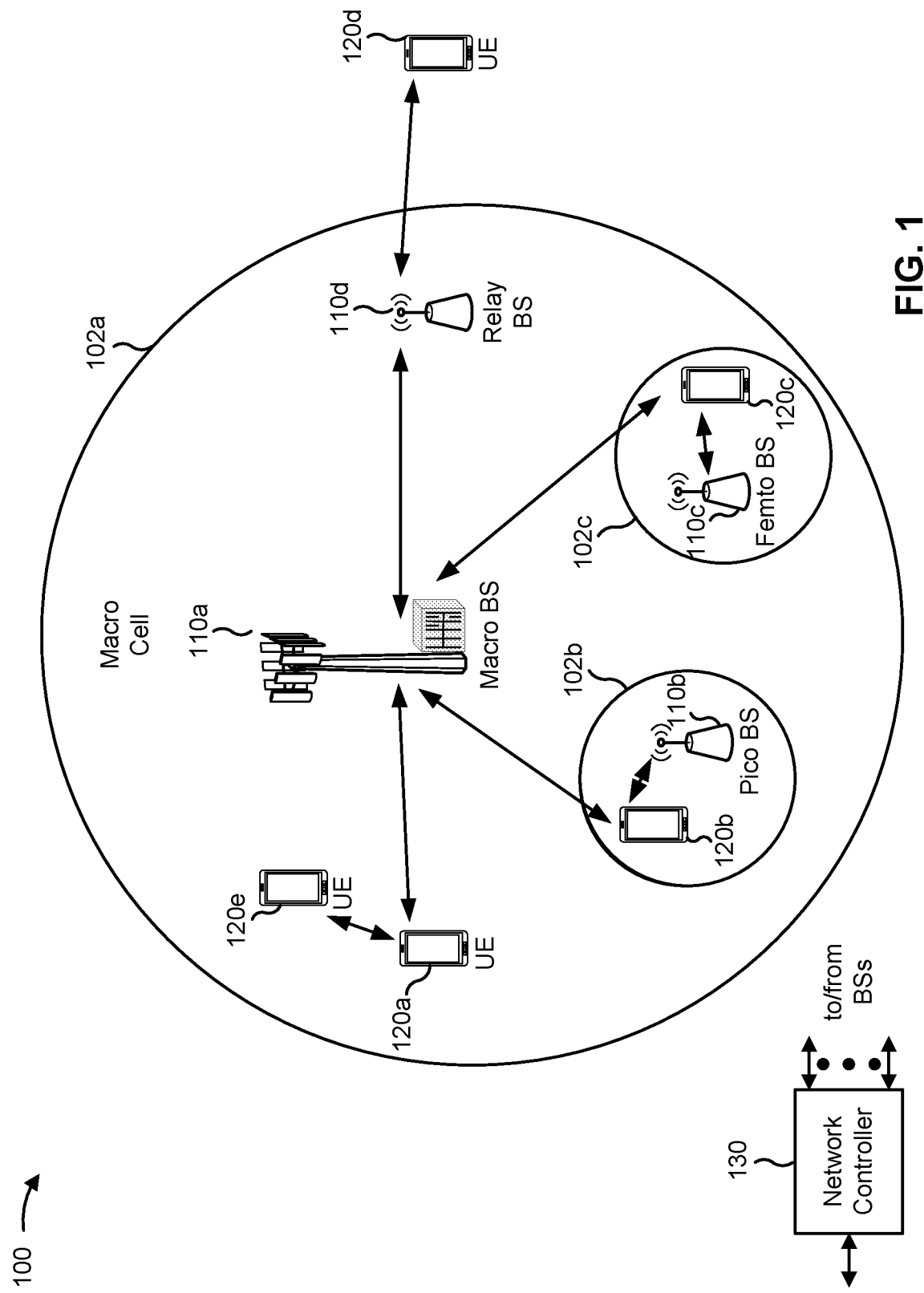
FIG. 1 is a block diagram conceptually illustrating an example of a wireless communication network, in accordance with various aspects of the present disclosure.

DETAILED DESCRIPTION 5G wireless networks are designed to provide a high data rate and to support a wide scope of application scenarios. Wireless full-duplex communication is a technique intended to increase link capacity in 5G wireless networks and/or to reduce latency for time-critical services. Wireless full-duplex enables radio network nodes to transmit and receive simultaneously on the same frequency band and at the same time slot. This contrasts with conventional half-duplex operation where transmission and reception differ in either time or in frequency. In full-duplex communications, a node, such as a base station (BS) or a user equipment (UE), can communicate simultaneously in uplink and downlink directions with two half-duplex nodes using the same radio resources (e.g., the same frequency band and time slot). Another full-duplex scenario includes one relay node communicating simultaneously with an anchor node and a mobile node in a one-hop manner.

One issue with full-duplex communications is self-interference cancellation. In order for a radio network node to implement full-duplex communications, the node needs to be capable of canceling self-interference from simultaneous downlink and uplink communications. For example, uplink and downlink communications can co-exist at the same frequency and time resources at a BS with use of full-duplex (e.g., the BS can receive an uplink communication from a first UE at a same time and at a same frequency at which the BS is transmitting a downlink communication to a second UE). As another example, an integrated and backhaul (IAB) node, which functions as a relay node between an IAB donor and a UE, can receive backhaul downlink communications on the same time-frequency resources that the IAB node is using to transmit access downlink communications to the UE, or vice versa (e.g., the IAB node may receive access uplink communications from the UE on the same time-frequency resources that the IAB node is using to transmit backhaul uplink communications to the IAB donor). Some techniques for canceling self-interference use beamforming, analog cancellation, digital cancellation, and/or antenna cancellation to cancel self-interference.

In addition to the self-interference issue, in practice, different communications from and/or to different wireless nodes have different loads and/or urgencies. For example, in some scenarios, the communications associated with a BS may include uplink enhanced mobile broadband (eMBB)-related communications that are high loaded (and thus need to occupy all radio resources of a slot), and downlink ultra reliable low latency communication (URLLC)-related communications that are low loaded but have a high urgency (and thus cannot wait until the uplink eMBB-related communications have been transmitted). As another example for IAB nodes, backhaul communications or access communications may be high loaded or may be low loaded and have a high urgency depending on a direction of the communications, similar to that described with regard to eMBB-related and URLLC-related communications.

In these examples, some part of the radio resources within a slot can be used for full-duplex communications, while other radio resources cannot be used for full-duplex communications. When all radio resources of a slot are used for full-duplex, all of the uplink communications experience the same self-interference from the downlink communications. In this case, the BS can determine a transmit power configuration, for communication on the uplink (e.g., physical uplink shared channel (PUSCH) communication), based at least in part on the expected self-interference, and the BS can configure the UE to utilize prior operations which are regulated for non-full-duplex communications. However, when a subset of the radio resources in a slot is used for full-duplex communications and another subset is used for non-full-duplex communications, the self-interference may not occur until full-duplex is used. In this case, using prior operations creates a conflicting choice for the BS. If the BS configures the UE with a transmit power configuration that is determined based on non-full-duplex (e.g., uplink-only) radio resources, the reception performance of PUSCH communications at the BS will be degraded. Conversely, if the BS configures the UE with a transmit power configuration that is based at least in part on the radio resources used for full-duplex, the transmit performance of the PUSCH communications become inefficient.

Some techniques and apparatuses described herein provide for physical uplink shared channel (PUSCH) transmit power configuration. In some aspects, a BS may transmit, to a wireless communication device (e.g., a UE, an IAB node, and/or the like), an indication of a first transmit power configuration and a second transmit power configuration for a PUSCH communication. The wireless communication device may receive the indication of the first transmit power configuration and the second transmit power configuration, and may transmit, using a first transmit power that is based at least in part on the first transmit power configuration, a first portion of the PUSCH communication in a full-duplex portion of a time-frequency resource, and transmit, using a second transmit power that is based at least in part on the second transmit power configuration, a second portion of the PUSCH communication in a non-full-duplex portion of the time-frequency resource.

In this way, utilizing different transmit powers mitigates self-interference that might occur at a BS that is using full-duplex communications, thereby improving use of full-duplex. This facilitates use of full-duplex and non-full-duplex (e.g., half-duplex) in a single slot, without degrading a performance of communications, without decreasing an efficiency of the communications, and/or the like. Further, some techniques and apparatuses described herein reduce or eliminate a need to suspend on-going uplink communications for new downlink traffic by providing a way to perform the downlink transfer at any time during the on-going uplink transfer, or vice versa. Further, some techniques and apparatuses described herein maximize utilization of channel capacity (e.g., for eMBB services) while facilitating low latency (e.g., for URLLC services).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) (e.g., using full-duplex communication, non-full-duplex communication, and/or the like) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used. In some aspects, a BS may configure a UE with one or more transmit power configurations for communicating with the BS using full-duplex communication, non-full-duplex communication, and/or the like, as described herein.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
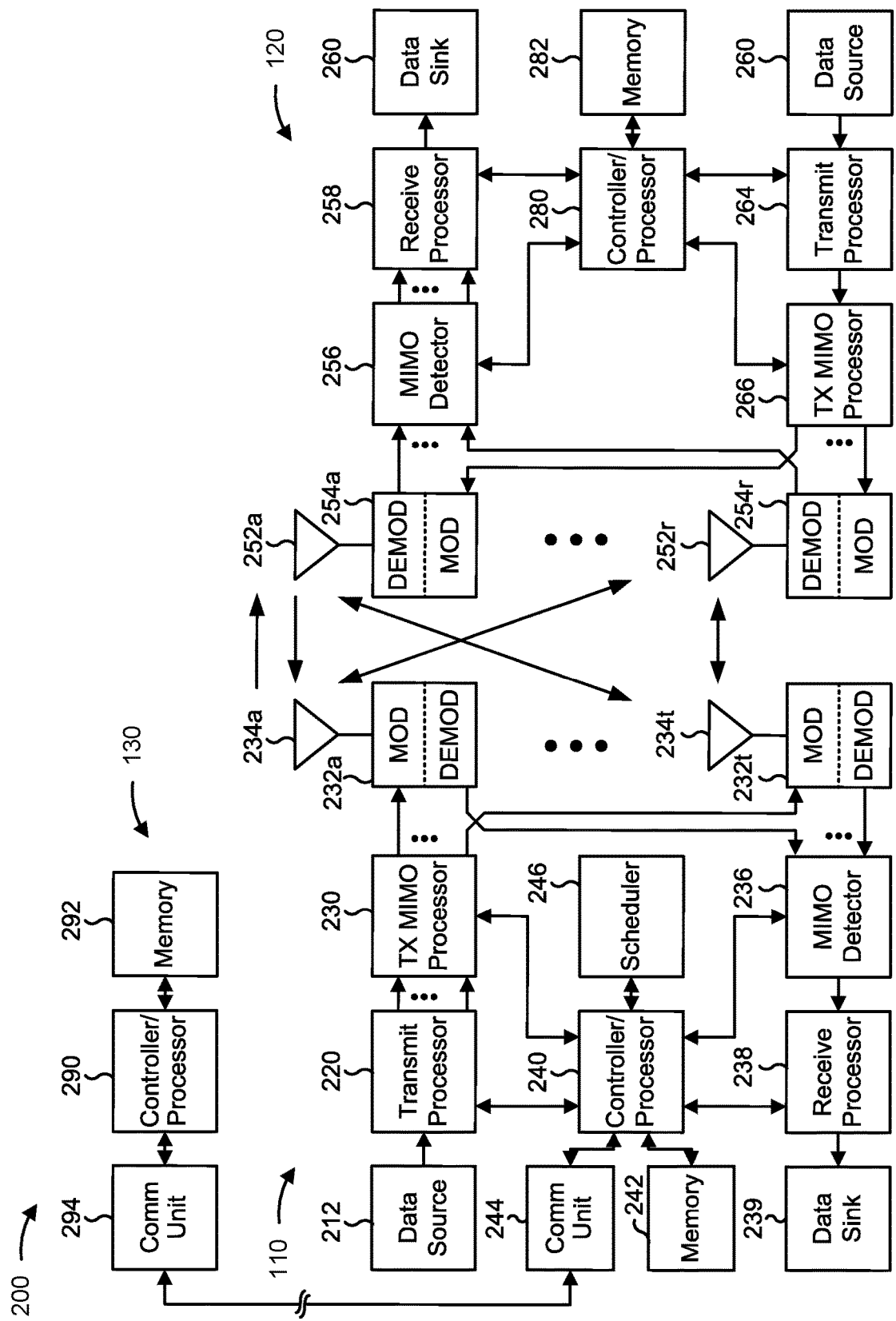
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PUSCH transmit power configuration, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

The stored program codes, when executed by processor 280 and/or other processors and modules at UE 120, may cause the UE 120 to perform operations described with respect to process 500 of FIG. 5 and/or other processes as described herein. The stored program codes, when executed by processor 240 and/or other processors and modules at base station 110, may cause the base station 110 to perform operations described with respect to process 500 of FIG. 5, process 600 of FIG. 6, and/or other processes as described herein. A scheduler 246 may schedule UEs for data transmission on the downlink and/or uplink.

In some aspects, a wireless communication device (e.g., base station 110, UE 120) may include means for receiving an indication of a first transmit power configuration and a second transmit power configuration for a PUSCH communication, means for transmitting, using a first transmit power that is based at least in part on the first transmit power configuration, a first portion of the PUSCH communication in a full-duplex portion of a time-frequency resource, means for transmitting, using a second transmit power that is based at least in part on the second transmit power configuration, a second portion of the PUSCH communication in a non-full-duplex portion of the time-frequency resource, and/or the like. In some aspects, such means may include one or more components of base station 110 and/or UE 120 described in connection with FIG. 2.

In some aspects, base station 110 may include means for transmitting an indication of a first transmit power configuration and a second transmit power configuration for a PUSCH communication, means for receiving a first portion of the PUSCH communication that is transmitted in a full-duplex portion of a time-frequency resource and at a first transmit power that is based at least in part on the first transmit power configuration, means for receiving a second portion of the PUSCH communication that is transmitted in a non-full-duplex portion of the time-frequency resource and at a second transmit power that is based at least in part on the second transmit power configuration, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

FIGS. 3A-3D are diagrams illustrating one or more examples 300 of PUSCH transmit power configuration, in accordance with various aspects of the present disclosure. As shown in FIGS. 3A-3D, one or more examples 300 include a BS (e.g., BS 110) and a wireless communication device (e.g., another BS 110, UE 120, and/or the like).

In some aspects, the BS may determine a time-frequency resource (e.g., one or more symbols, one or more slots, one or more resource elements, one or more resource blocks, and/or the like) in which full-duplex communication and non-full-duplex communication are to be performed. In this case, the BS may determine a non-full-duplex portion of the time-frequency resource and a full-duplex portion of the time-frequency resource based at least in part on having data to transmit to the wireless communication device and/or based at least in part on having data to receive from the wireless communication device in the time-frequency resource. The full-duplex portion may be intended for simultaneous downlink transmission (e.g., for transmitting one or more PDSCH communications to the wireless communication device, to another wireless communication device, and/or the like) and uplink reception (e.g., for receiving one or more PUSCH communications from the wireless communication device), and the non-full-duplex portion may be intended for only reception (e.g., for receiving one or more PUSCH communications from the wireless communication device).

Figure 3A:
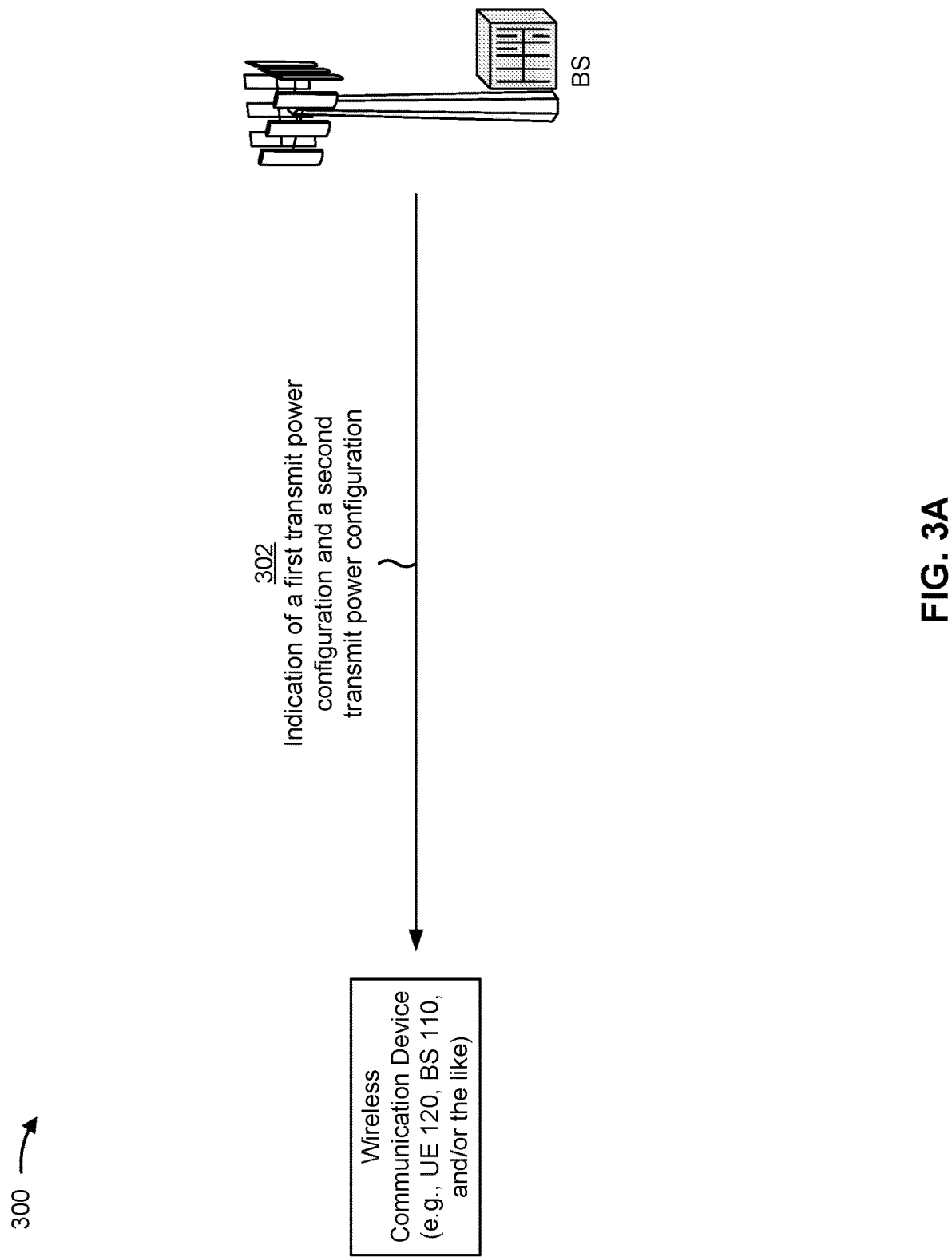
FIGS. 3A-4C are diagrams illustrating various examples of physical uplink shared channel (PUSCH) transmit power configuration, in accordance with various aspects of the present disclosure.

As shown in FIG. 3A, and by reference number 302, the BS may transmit, based at least in part on determining the time-frequency resource in which full-duplex communication and non-full-duplex communication are to be performed, an indication of a first transmit power configuration and a second transmit power configuration to the wireless communication device. In some aspects, the BS may transmit the indication of the first transmit power configuration and the second transmit power configuration in one or more signaling communications. The one or more signaling communications may include one or more radio resource control (RRC) communications, one or more medium access control (MAC) control element (MAC-CE) communications, one or more downlink control information (DCI) communications, and/or the like.

The first transmit power configuration may be associated with the full-duplex portion of the time-frequency resource and the second transmit power configuration may be associated with the non-full-duplex portion of the time-frequency resource. That is, the wireless communication device may use the first transmit power configuration to transmit, to the BS, a portion of a PUSCH communication (and/or one or more PUSCH communications) in the full-duplex portion, and may use the second transmit power configuration to transmit, to the B S, another portion of the PUSCH (and/or one or more other PUSCH communications) in the non-full-duplex portion.

The transmit power configurations (e.g., the first transmit power configuration and the second transmit power configuration) may indicate one or more transmit power parameters. The wireless communication device may use the one or more transmit power parameters, indicated in the first transmit power configuration, to determine a first transmit power for transmitting the portion of the PUSCH communication (and/or one or more PUSCH communications) in the full-duplex portion, and may use the one or more transmit power parameters, indicated in the second transmit power configuration, to determine a second transmit power for transmitting the other portion of the PUSCH communication (and/or one or more other PUSCH communications) in the non-full-duplex portion. The first transmit power and the second transmit power may be different transmit powers. For example, the BS may configure the first transmit power configuration and the second transmit power configuration such that the first transmit power is a greater transmit power relative to the second transmit power. This may mitigates self-interference that would otherwise occur at the BS due to simultaneous transmission and reception in the full-duplex portion, while increasing transmit performance and efficiency at the wireless communication device in the non-full-duplex portion.

In some aspects, the one or more transmit power parameters may include an open-loop power control parameter and/or a closed-loop transmit power control (TPC) command. For example, the first transmit power configuration may include a first open-loop power control parameter and/or a first closed-loop TPC command, and the second transmit power configuration may include a second open-loop power control parameter and/or a second closed-loop TPC command.

The open-loop control parameter may indicate a target receive power and/or a pathloss multiplier. The target receive power may be a receive power, specified by the BS, at which a PUSCH communication is to be received at the BS. The pathloss multiplier may include a value that compensates for pathloss between the wireless communication device and the BS. In some aspects, the BS may determine the pathloss multiplier based at least in part on a distance between the BS and the wireless communication device, inference experienced between the BS and the wireless communication device, and/or the like.

In some aspects, the first open-loop control parameter may indicate a first target receive power and/or a first pathloss multiplier, and the second open-loop control parameter may indicate a second target receive power and/or a second pathloss multiplier. The BS may configure the first transmit power configuration and the second transmit power configuration such that the first target receive power is greater relative to the second target receive power and/or the first pathloss multiplier is a greater value relative to the second pathloss multiplier.

In some aspects, the BS may limit the difference in receive power between the first target receive power and the second target receive power to reduce and/or prevent interference between wireless communication devices in the full-duplex portion. In this case, the BS may limit the difference in receive power between the first target receive power and the second target receive power based at least in part on a permitted interference power at another wireless communication device (or the other wireless communication device's capability to handle and/or accommodate interference), based at least in part on a distance between the wireless communication device and the other wireless communication device, and/or the like. For example, the BS may limit the difference in receive power between the first target receive power and the second target receive power such that the first transmit power, of the portion of the PUSCH communication in the full-duplex portion, multiplied by the inter-wireless communication device pathloss between the wireless communication device and the other wireless communication device, is not greater than a maximum permitted interference power at the other wireless communication device. In this way, the BS can reduce, minimize, and/or otherwise prevent interference with the other wireless communication device's downlink reception that is caused by the wireless communication device's uplink transmission in the full-duplex portion.

In some aspects, the BS may explicitly indicate, to the wireless communication device, the first target receive power, the second target receive power, the first pathloss multiplier, and/or the second pathloss multiplier. In some aspects, the BS may explicitly indicate the second target receive power and may implicitly indicate the first target receive power (e.g., by indicating a difference or delta between the second target receive power and the first target receive power). In some aspects, the BS may explicitly indicate the second pathloss multiplier and may implicitly indicate the first pathloss multiplier (e.g., by indicating a difference or delta between the value of the second pathloss multiplier and the value of the first pathloss multiplier).

A closed-loop TPC command may indicate, to the wireless communication device, to adjust (e.g., increase or decrease) the current transmit power of the UE. For example, a closed-loop TPC command may indicate a transmit power adjustment in decibels (dB) (e.g., +3 dB, −2 dB, and/or the like), in a percentage (e.g., +5%, −3%, and/or the like), and/or the like. The BS may use the first closed-loop TPC command to fine-tune the transmit power, of the wireless communication device, in the full-duplex portion, and may use the second closed-loop TPC command to fine-tune the transmit power, of the wireless communication device, in the non-full-duplex portion.

In some aspects, the first closed-loop TPC command and the second closed-loop TPC command may share a TPC accumulation for the time-frequency resource or may be associated with separate TPC accumulations. A TPC accumulation may include an accumulation of closed-loop TPC command adjustment values. For example, if the BS transmits, to the wireless communication device, three closed-loop TPC command adjustment values in a time-frequency resource, respectively being +3 dB, +3 dB, −3 dB, the TPC accumulation for the time-frequency resource would be +3 dB. If the first closed-loop TPC command and the second closed-loop TPC command may share a TPC accumulation, the wireless communication device may carry over the TPC accumulation from one portion of the time-frequency resource (e.g., the non-full-duplex portion or the full-duplex portion) to another portion of the time-frequency resource.

If the first closed-loop TPC command and the second closed-loop TPC command are associated with separate TPC accumulations, the wireless communication device may track a first TPC accumulation for the full-duplex portion of the time-frequency resource and a second TPC accumulation for the non-full-duplex portion, which increases the BS's flexibility in mitigating self-interference at the BS.

In some aspects, the first transmit power configuration and the second transmit power configuration may further respectively indicate respective resource positions for the full-duplex portion and the non-full-duplex portion. For example, the first transmit power configuration may indicate a first resource position of the full-duplex portion, which may indicate the time-domain resources and/or the frequency domain resources, included in the time-frequency resource, occupied by the full-duplex portion. Similarly, the second transmit power configuration may indicate a second resource position of the non-full-duplex portion, which may indicate the time-domain resources and/or the frequency domain resources, included in the time-frequency resource, occupied by the non-full-duplex portion.

In some aspects, the first transmit power configuration and the second transmit power configuration may further respectively indicate transport formats (e.g., modulation coding schemes (MC S), and/or the like) for the full-duplex portion and the non-full-duplex portion. For example, if the BS expects a gain (or difference) between the first target receive power and the second target receive power to mitigate an interference-plus-noise boost associated with full-duplex self-interference at the BS, the BS may specify that the first transport format and the second transport format are the same transport format. As another example, if the BS expects that a gain (or difference) between the first target receive power and the second target receive power might not mitigate an interference-plus-noise boost associated with full-duplex self-interference at the BS, the BS may specify different transport formats for the first transport format and the second transport format. As another example, if the BS expects the first target receive power and the second target receive power to be the same (e.g., the exact same, substantially the same, within a threshold percentage, and/or the like), the BS may specify different transport formats for the first transport format and the second transport format.

Figure 3B:
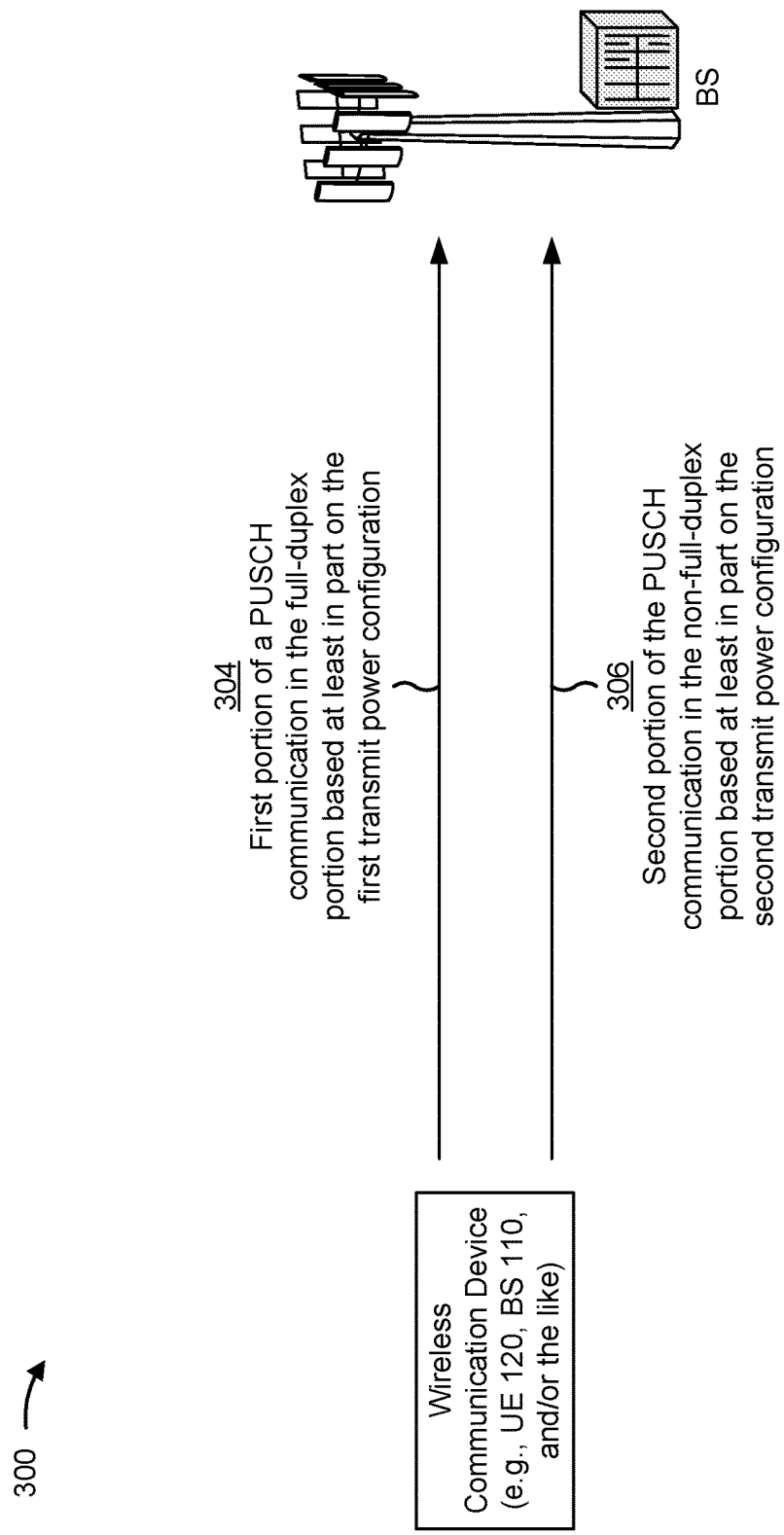

As shown in FIG. 3B, and by reference number 304, the wireless communication device may transmit, to the BS, the first portion of the PUSCH communication in the full-duplex portion of the time-frequency resource based at least in part on the first transmit power configuration and, as shown by reference number 306, the wireless communication device may transmit, to the BS, the second portion of the PUSCH communication in the non-full-duplex portion of the time-frequency resource based at least in part on the second transmit power configuration. In some aspects, the wireless communication device may transmit one or more PUSCH communications in the full-duplex portion based at least in part on the first transmit power configuration, and may transmit one or more other PUSCH communications in the non-full-duplex portion based at least in part on the second transmit power configuration.

In some aspects, the wireless communication device may determine a first transmit power based at least in part on the first transmit power configuration and may determine a second transmit power based at least in part on the second transmit power configuration. The wireless communication device may transmit the first portion of the PUSCH communication in the full-duplex portion using the first transmit power and may transmit the second portion of the PUSCH communication in the non-full-duplex portion using the second transmit power.

In some aspects, the wireless communication device may determine the first transmit power based at least in part on Equation 1:

$$P_{PUSCH,b,f,c}(i, j, q_d, l) = $$

$$\min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

Equation 1 where $P_{PUSCH}$ is the first transmit power, $P_{CMAX}$ is maximum transmit power of the wireless communication device, $P_{O\_PUSCH}$ is the first target receive power indicated in the first open-loop control parameter of the first transmit power configuration, a is the first pathloss multiplier indicated in the first open-loop control parameter of the first transmit power configuration, f is the TPC accumulation indicated in the first closed-loop TPC command of the first transmit power configuration, and $M_{RB}^{PUSCH}$ is the quantity of physical resource blocks (PRBs) included in the PUSCH communication during the full-duplex portion. The wireless communication device may similarly determine the second transmit power, according to Equation 1, using the second target receive power indicated in the second open-loop control parameter of the second transmit power configuration, the second pathloss multiplier indicated in the second open-loop control parameter of the second transmit power configuration, the TPC accumulation indicated in the second closed-loop TPC command, and the quantity of PRBs included in the PUSCH communication during the non-full-duplex portion.

Figure 3C:
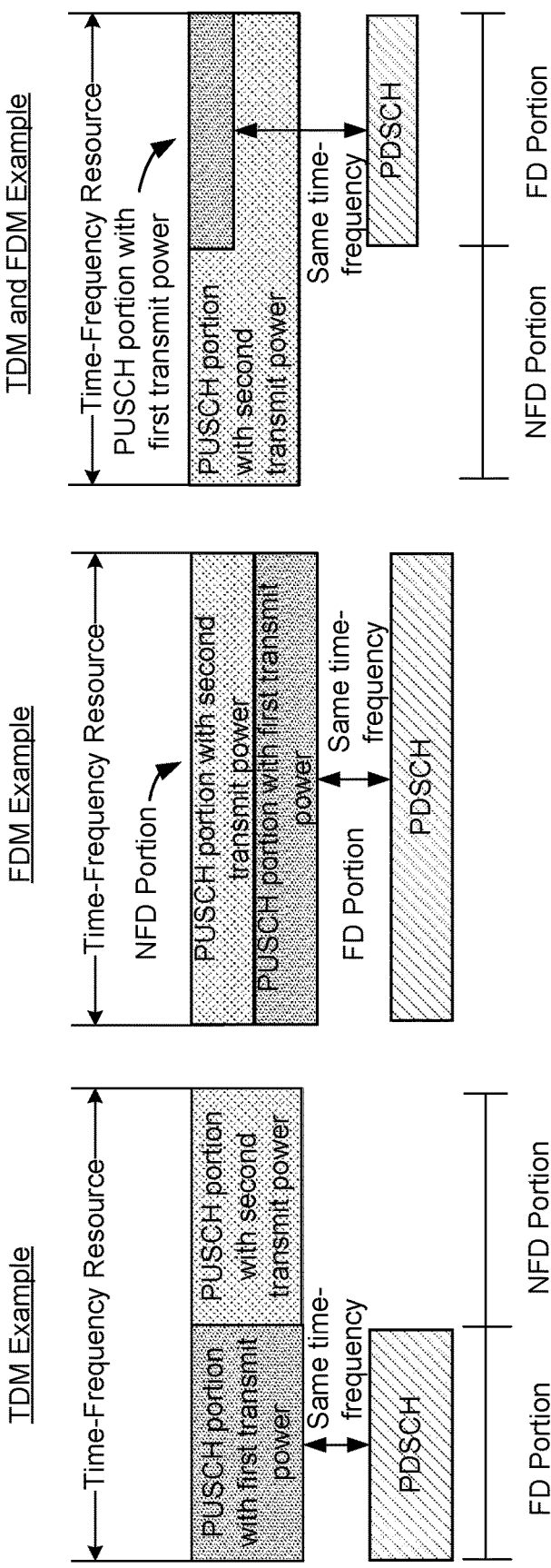

In some aspects, the wireless communication device may determine the first transmit power and the second transmit power based at least in part on whether the full-duplex portion and the non-full-duplex portion are time division multiplexed (TDM) in the time-frequency resource, frequency division multiplexed (FDM) in the time-frequency resource, or TDM and FDM in the time-frequency resource. FIG. 3C illustrates respective examples of the full-duplex portion and the non-full-duplex portion being TDM in the time-frequency resource, the full-duplex portion and the non-full-duplex portion being FDM in the time-frequency resource, and the full-duplex portion and the non-full-duplex portion being TDM and FDM in the time-frequency resource.

As shown in the TDM example in FIG. 3C, a first portion of the PUSCH communication transmission may occupy the same time-domain resources (e.g., symbols, slots, and/or the like) and frequency-domain resources (e.g., resource elements, resource blocks, and/or the like) as the BS's PDSCH communication transmission in the full-duplex portion, and a second portion of the PUSCH communication transmission may occupy the non-full-duplex portion. The time-domain resources of the time-frequency resource may be divided among the full-duplex portion and the non-full-duplex portion. In this case, the wireless communication device may determine the first transmit power, according to Equation 1, for the entire bandwidth of the PUSCH communication in the full-duplex portion (e.g., for all of the PRBs of the PUSCH communication in the full-duplex portion). Moreover, the wireless communication device may determine the second transmit power, according to Equation 1, for the entire bandwidth of the PUSCH communication in the non-full-duplex portion (e.g., for all of the PRBs of the PUSCH communication in the non-full-duplex portion).

As shown in the FDM example in FIG. 3C, a first portion of the PUSCH communication transmission may occupy the same time-domain resources (e.g., symbols, slots, and/or the like) and frequency-domain resources (e.g., resource elements, resource blocks, and/or the like) as the BS's PDSCH communication transmission in the full-duplex portion, and a second portion of the PUSCH communication transmission may occupy the non-full-duplex portion. The frequency-domain resources of the time-frequency resource may be divided among the full-duplex portion and the non-full-duplex portion. In this case, the wireless communication device may determine the first transmit power, according to Equation 1, for one or more first PRBs in which the PUSCH communication is to be transmitted in the full-duplex portion, and may determine the second transmit power, according to Equation 1, for one or more second PRBs in which the PUSCH communication is to be transmitted in the non-full-duplex portion. The wireless communication device may determine whether a sum of the first transmit power and the second transmit power satisfies a transmit power threshold for the wireless communication device. The transmit power threshold may be the maximum transmit power of the wireless communication device. If the sum of the first transmit power and the second transmit power in the time-frequency resource satisfies the transmit power threshold (e.g., the sum does not exceed the maximum transmit power of the wireless communication device), the wireless communication device may transmit the first portion of the PUSCH communication using the first transmit power, and may transmit the second portion of the PUSCH communication using the second transmit power.

If the sum of the first transmit power and the second transmit power in the time-frequency resource does not satisfy the transmit power threshold (e.g., the sum exceeds the maximum transmit power of the wireless communication device), the wireless communication device may perform one or more techniques to reduce the sum of the first transmit power and the second transmit power until the sum satisfies the transmit power threshold (e.g., until the sum does not exceed the maximum transmit power of the wireless communication device). For example, the wireless communication device may decrease the first transmit power and the second transmit power, based at least in part on a common decreasing ratio, until the sum of the first transmit power and the second transmit power satisfies the transmit power threshold. In this case, the first transmit power and the second transmit power are equally reduced according to the ratio, which may be specified in the one or more signaling communications, hard-coded at the wireless communication device, calculated by the wireless communication device, and/or the like. The wireless communication device may then transmit the first portion of the PUSCH communication using the decreased first transmit power, and may transmit the second portion of the PUSCH communication using the decreased second transmit power.

As another example, the wireless communication device may decrease the first transmit power until the sum of the first transmit power and the second transmit power satisfies the transmit power threshold or until the first transmit power reaches a threshold or zero. If the sum of the first transmit power and the second transmit power satisfies the transmit power threshold after decreasing the first transmit power, the wireless communication device may transmit the first portion of the PUSCH communication using the decreased first transmit power, and may transmit the second portion of the PUSCH communication using the second transmit power. If the sum of the first transmit power and the second transmit power still does not satisfy the transmit power threshold after decreasing the first transmit power to the threshold or zero, the wireless communication device may decrease the second transmit power until the sum of the first transmit power and the second transmit power satisfies the transmit power threshold.

As shown in the TDM and FDM example in FIG. 3C, a first portion of the PUSCH communication transmission may occupy the same time-domain resources (e.g., symbols, slots, and/or the like) and frequency-domain resources (e.g., resource elements, resource blocks, and/or the like) as the BS's PDSCH communication transmission in the full-duplex portion, and a second portion of the PUSCH communication transmission may occupy the non-full-duplex portion. At least a portion of the time-domain resources and/or at least a portion of the frequency-domain resources of the full-duplex portion may overlap with at least a portion of the time-domain resources and/or at least a portion of the frequency-domain resources of the non-full-duplex portion. In this case, the UE may determine the first transmit power and the second transmit power in the overlapped time-domain resource using similar techniques as described above in connection with the FDM example, and determine the second transmit power in the non-overlapped time-domain resource using similar techniques as described above in connection with the TDM example.

Figure 3D:
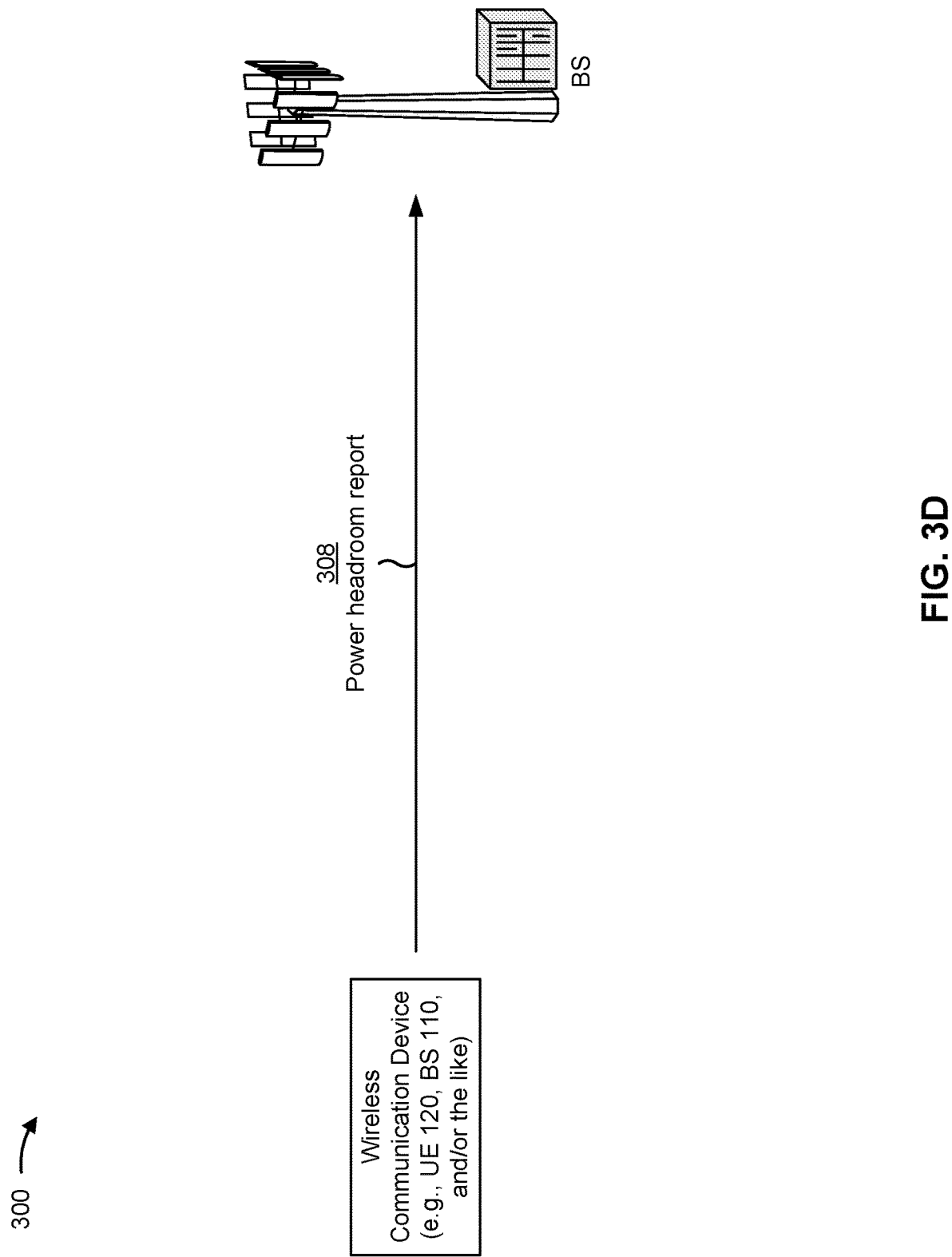

As shown in FIG. 3D, and by reference number 308, the wireless communication device may transmit (e.g., concurrently with the PUSCH communication(s), after the transmission of the PUSCH communication(s), and/or the like) a power headroom report to the BS. In some aspects, the wireless communication device may transmit the power headroom report in a communication such as an uplink control information (UCI) communication, a MAC-CE communication, and/or the like.

The power headroom report may include one or more power headroom values that indicate an amount of headroom (or margin) between the first transmit power and the second transmit power, that were used to transmit the PUSCH communication(s) in the time-frequency resource, and a maximum transmit power of the wireless communication device. The BS may receive the power headroom report and may adjust the first transmit power configuration and/or the second transmit power configuration based at least in part on the one or more power headroom values indicated in the power headroom report. For example, the BS may adjust, based at least in part on the one or more power headroom values, the first target receive power, the second target receive power, the first pathloss multiplier, the second pathloss multiplier, the one or more TPC accumulations, and/or the like.

In some aspects, the one or more power headroom values may include a first power headroom value that is based at least in part on the first transmit power configuration (e.g., based at least in part on the first target receive power, the first pathloss multiplier, the TPC accumulation associated with the full-duplex portion, and/or the like), a second power headroom value that is based at least in part on the second transmit power configuration (e.g., based at least in part on the second target receive power, the second pathloss multiplier, the TPC accumulation associated with the non-full-duplex portion, and/or the like), a third power headroom value that is based at least in part on the first transmit power configuration and the second transmit power configuration (e.g., based at least in part on the first target receive power, the first pathloss multiplier, the TPC accumulation associated with the full-duplex portion, the second target receive power, the second pathloss multiplier, the TPC accumulation associated with the non-full-duplex portion, and/or the like), and/or the like.

In some aspects, the wireless communication device may determine the first headroom value based at least in part on determining a total transmit power in the full-duplex portion (e.g., by multiplying the first target receive power per PRB by the quantity of PRBs in the full-duplex portion of the PUSCH communication) and subtracting the total transmit power from the maximum transmit power of the wireless communication device. In some aspects, the wireless communication device may determine the second headroom value based at least in part on determining a total transmit power in the non-full-duplex portion (e.g., by multiplying the second target receive power per PRB by the quantity of PRBs in the non-full-duplex portion of the PUSCH communication) and subtracting the total transmit power from the maximum transmit power of the wireless communication device. In some aspects, the wireless communication device may determine the first power headroom value and the second power headroom value according to Equation 2:

$$PH_{type1,b,f,c}(i, j, q_d, l) = \qquad \text{Equation 2}$$
$$P_{CMAX,f,c}(i) - \{P_{O_{PUSCH},b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,c,f}(i) + f_{b,f,c}(i, l)\}$$

where PH is the power headroom value, $P_{CMAX}$ is the maximum transmit power of the wireless communication device, $M_{RB}^{PUSCH}$ is the quantity of PRBs included in the full-duplex portion (e.g., for the first power headroom value) or non-full-duplex portion (e.g., for the second power headroom value), $P_O$ is the first target receive power (e.g., for the first power headroom value) or the second target receive power (e.g., for the second power headroom value), a is the first pathloss multiplier (e.g., for the first power headroom value) or the second pathloss multiplier (e.g., for the second power headroom value), and f is the TPC accumulation (e.g., for the first power headroom value or the second power headroom value). In some aspects, the wireless communication device may determine the first power headroom value and the second power headroom value according to Equation 2 when the full-duplex portion and the non-full-duplex portion are TDM in the time-frequency resource.

In some aspects, the wireless communication device may determine the third headroom value based at least in part on determining a total transmit power in the full-duplex portion and non-full-duplex portion (e.g., by multiplying the first target receive power per PRB by the quantity of PRBs in the full-duplex portion of the PUSCH communication, and by adding the resulting product by the product of multiplying the second target receive power per PRB by the quantity of PRBs in the non-full-duplex portion of the PUSCH communication) and subtracting the total transmit power from the maximum transmit power of the wireless communication device. In some aspects, the wireless communication device may determine the third power headroom value according to Equation 3:

$$PH_{type1,b,f,c}(i, j, q_d, l) = P_{CMAX,f,c}(i) - \qquad \text{Equation 3}$$

-continued $$\left\{10\log_{10}\left(10^{\frac{P_0^{(1)}}{10}}\cdot 2^\mu \cdot M^{(1)} + 10^{\frac{P_0^{(2)}}{10}}\cdot 2^\mu \cdot M^{(2)}\right) + \right.$$
$$\left. \alpha_{b,f,c}(j)\cdot PL_{b,f,c}(q_d) + \Delta_{TF,b,c,f}(i) + f_{b,f,c}(i,l)\right\}$$

where PH is the power headroom value, $P_{CMAX}$ is the maximum transmit power of the wireless communication device, $M^{(1)}$ and $M^{(2)}$ are respectively the quantity of PRBs included in the full-duplex portion and non-full-duplex portion, and $P_O^1$ and $P_O^2$ are respectively the first target receive power and the second target receive power. In some aspects, the wireless communication device may determine the first power headroom value and the second power headroom value according to Equation 3 when the full-duplex portion and the non-full-duplex portion are FDM or TDM and FDM in the time-frequency resource.

In this way, the BS may transmit, to the wireless communication device, an indication of a first transmit power configuration and a second transmit power configuration for a PUSCH communication. The wireless communication device may receive the indication of the first transmit power configuration and the second transmit power configuration, and may transmit, using a first transmit power that is based at least in part on the first transmit power configuration, a first portion of the PUSCH communication in a full-duplex portion of a time-frequency resource, and transmit, using a second transmit power that is based at least in part on the second transmit power configuration, a second portion of the PUSCH communication in a non-full-duplex portion of the time-frequency resource. Utilizing different transmit powers mitigates self-interference that might occur at the BS, thereby improving use and/or performance of full-duplex communications. This facilitates use of full-duplex and non-full-duplex in a time-frequency resource, without degrading a performance of communications, without decreasing an efficiency of the communications, and/or the like. Further, some techniques and apparatuses described herein reduce or eliminate a need to suspend on-going uplink communications for new downlink traffic by providing a way to perform the downlink transfer at any time during the on-going uplink transfer, or vice versa. Further, some techniques and apparatuses described herein maximize utilization of channel capacity (e.g., for eMBB services) while facilitating low latency (e.g., for URLLC services).

As indicated above, FIGS. 3A-3D are provided as examples. Other examples may differ from what is described with respect to FIGS. 3A-3D. For example, FIGS. 3A-3D illustrate one or more examples where a full-duplex portion of a time-frequency resource includes a PUSCH communication transmission and a PDSCH communication transmission, such as where a BS and a UE communicate in the time-frequency resource. However, the techniques and aspects described above in connection with FIGS. 3A-3D may be practiced in other scenarios, such as where a BS and another BS communicate in the time-frequency resource. For example, the BS (e.g., an IAB node) may receive a backhaul downlink communication from the other BS (e.g., an IAB donor) and may transmit an access downlink communication to a UE in the full-duplex portion. As another example, the BS (e.g., an IAB node) may transmit a backhaul uplink communication from the other BS (e.g., an IAB donor) and may receive an access uplink communication to a UE in the full-duplex portion.

Figure 4A:
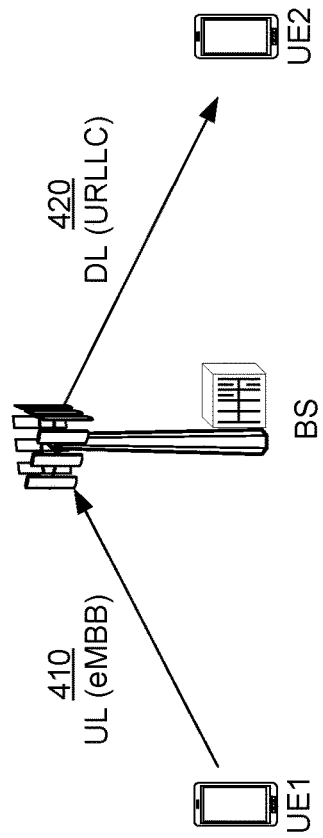
Figure 4B:
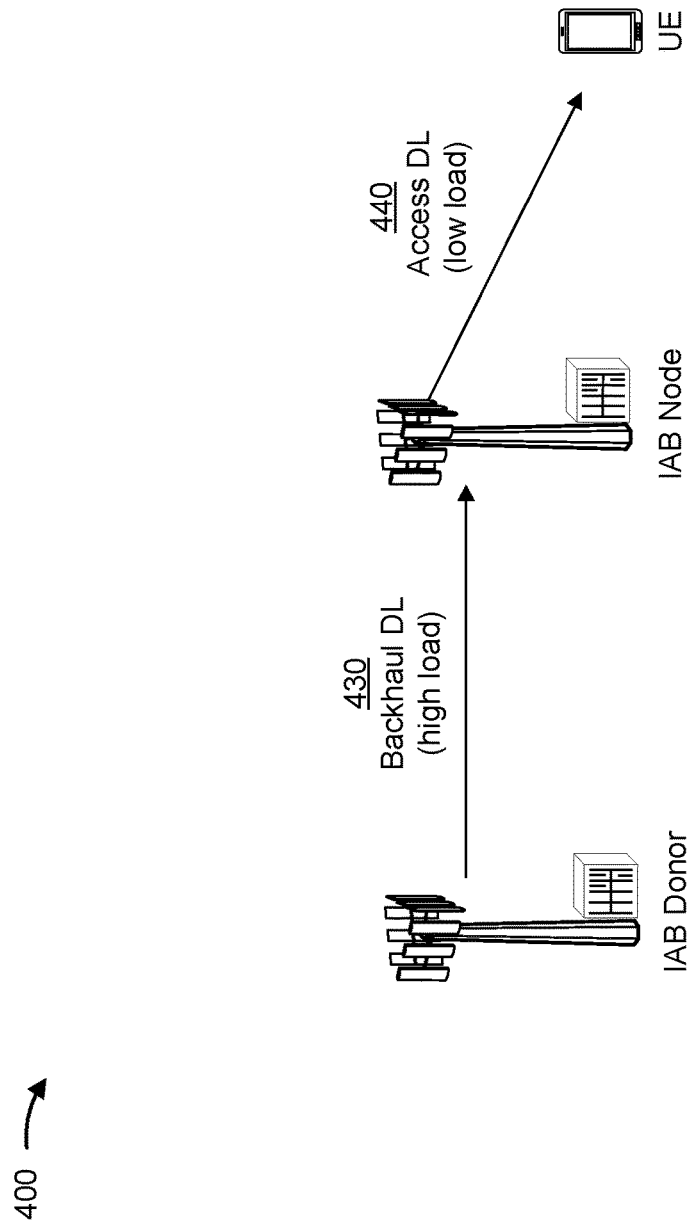
Figure 4C:
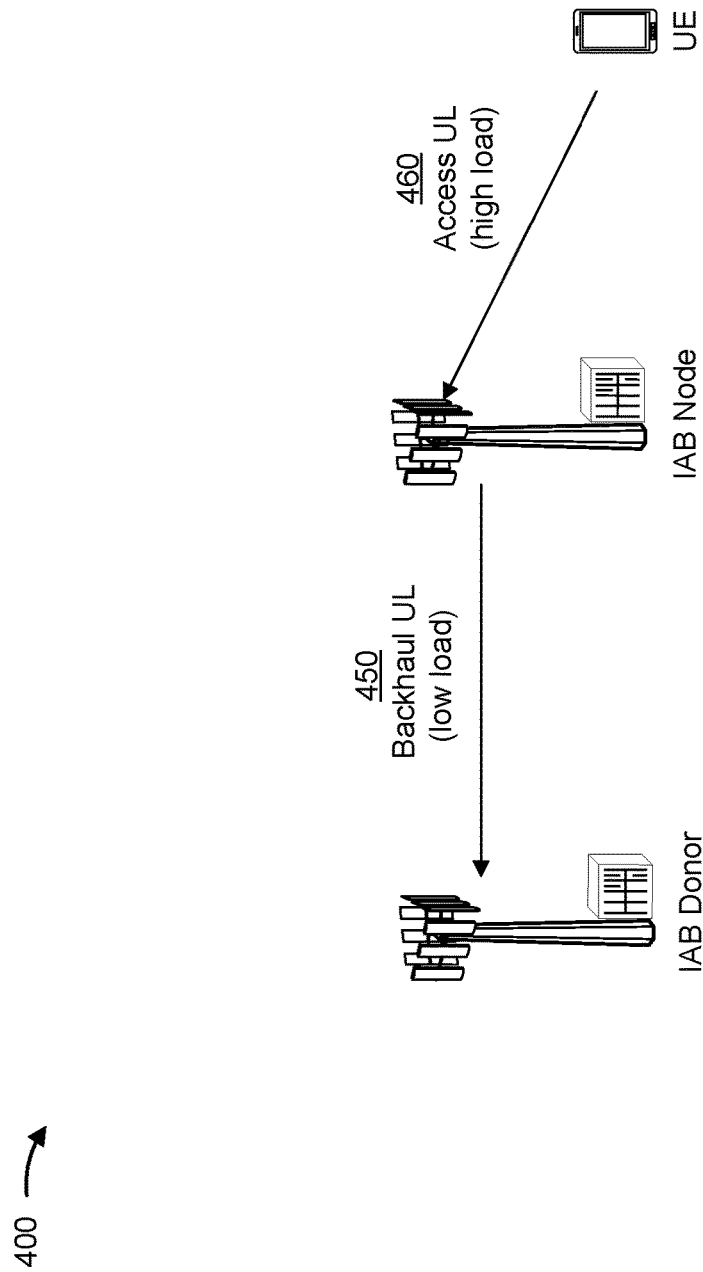

FIGS. 4A-4C are diagrams illustrating one or more examples 400 related to PUSCH transmit power configuration in a slot with full-duplex, in accordance with various aspects of the present disclosure. For example, FIGS. 4A-4C show various example deployment scenarios in which some aspects described herein may be implemented.

FIG. 4A shows a first example deployment scenario in which some aspects described herein may be implemented. In this first example scenario, uplink (UL) and downlink (DL) communications between a BS (e.g., BS 110) and multiple UEs (e.g., UEs 120) may be full-duplex communications. For example, and as shown by reference number 410, a UE1 may transmit UL (eMBB) communications to the BS. As shown by reference number 420, the BS may transmit DL (URLLC) communications to a UE2 on a same carrier on which the BS is receiving the UL communications. Some aspects described herein mitigates self-interference that would otherwise occur at the BS due to the simultaneous reception and transmission described above.

FIG. 4B shows a second example deployment scenario in which some aspects described herein may be implemented. In this second example scenario, an IAB node (e.g., a first BS 110) communicates simultaneously with an IAB donor (e.g., a second BS 110) and a UE. As shown by reference number 430, the IAB node may receive backhaul DL (high load) communications from the IAB donor. As shown by reference number 440, the IAB node may transmit access DL (low load) communications to the UE on a same carrier as the backhaul DL communications. Some aspects described herein mitigates self-interference that would otherwise occur at the IAB node due to the simultaneous reception and transmission described above.

FIG. 4C shows a third example deployment scenario in which some aspects described herein may be implemented. In this third example scenario, an IAB node (e.g., a first BS 110) communicates simultaneously with an IAB donor (e.g., a second BS 110) and a UE. As shown by reference number 450, the IAB node may transmit backhaul UL (low load) communications to the IAB donor. As shown by reference number 460, the IAB node may receive access UL (high load) communications from the UE on a same carrier as the backhaul uplink communications. Some aspects described herein mitigates self-interference that would otherwise occur at the IAB node due to the simultaneous reception and transmission described above.

As indicated above, FIGS. 4A-4C are provided as one or more examples. Other examples may differ from what is described with respect to FIGS. 4A-4C.

FIG. 5 is a diagram illustrating an example process 500 performed, for example, by a wireless communication device, in accordance with various aspects of the present disclosure. Example process 500 is an example where a wireless communication device (e.g., BS 110, UE 120, and/or the like) performs operations associated with PUSCH transmit power configuration.

As shown in FIG. 5, in some aspects, process 500 may include receiving an indication of a first transmit power configuration and a second transmit power configuration for a PUSCH communication (block 510). For example, the wireless communication device (e.g., using transmit processor 220, receive processor 238, controller/processor 240, memory 242, receive processor 258, transmit processor 264, controller/processor 280, memory 282, and/or the like) may receive an indication of a first transmit power configuration and a second transmit power configuration for a PUSCH communication, as described above.

As further shown in FIG. 5, in some aspects, process 500 may include transmitting, using a first transmit power that is based at least in part on the first transmit power configuration, a first portion of the PUSCH communication in a full-duplex portion of a time-frequency resource (block 520). For example, the wireless communication device (e.g., using transmit processor 220, receive processor 238, controller/processor 240, memory 242, receive processor 258, transmit processor 264, controller/processor 280, memory 282, and/or the like) may transmit, using a first transmit power that is based at least in part on the first transmit power configuration, a first portion of the PUSCH communication in a full-duplex portion of a time-frequency resource, as described above.

As further shown in FIG. 5, in some aspects, process 500 may include transmitting, using a second transmit power that is based at least in part on the second transmit power configuration, a second portion of the PUSCH communication in a non-full-duplex portion of the time-frequency resource (block 530). For example, the wireless communication device (e.g., using transmit processor 220, receive processor 238, controller/processor 240, memory 242, receive processor 258, transmit processor 264, controller/processor 280, memory 282, and/or the like) may transmit, using a second transmit power that is based at least in part on the second transmit power configuration, a second portion of the PUSCH communication in a non-full-duplex portion of the time-frequency resource, as described above.

Process 500 may include additional aspects, such as any single implementation or any combination of aspects described below and/or in connection with one or more other processes described elsewhere herein.

In a first aspect, the first transmit power configuration indicates a first open-loop power control parameter and a first closed-loop TPC command and the second transmit power configuration indicates a second open-loop power control parameter and a second closed-loop TPC command. In a second aspect, alone or in combination with the first aspect, the first open-loop power control parameter comprises at least one of a first target receive power or a first pathloss multiplier, and the second open-loop power control parameter comprises at least one of a second target receive power or a second pathloss multiplier.

In a third aspect, alone or in combination with one or more of the first and second aspects, the first target receive power is greater relative to the second target receive power and/or the first pathloss multiplier is greater relative to the second pathloss multiplier. In a fourth aspect, alone or in combination with one or more of the first through third aspects, the first target receive power and the second target receive power are explicitly indicated. In a fifth aspect, alone or in combination with one or more of the first through third aspects, the second target receive power is explicitly indicated. In some aspects, the first target receive power is implicitly indicated relative to the second target receive power.

In a sixth aspect, alone or in combination with one or more of the first through fifth aspects, a difference between the first target receive power and the second target receive power is based at least in part on a permitted interference power at another wireless communication device associated with the full-duplex portion. In a seventh aspect, alone or in combination with one or more of the first through sixth aspects, a difference between the first target receive power and the second target receive power is based at least in part on a distance between the wireless communication device and another wireless communication device.

In an eighth aspect, alone or in combination with one or more of the first through seventh aspects, the first closed-loop TPC command and the second closed-loop TPC command share a TPC accumulation for the time-frequency resource. In a ninth aspect, alone or in combination with one or more of the first through seventh aspects, the first closed-loop TPC command is associated with a TPC accumulation for the full-duplex portion of the time-frequency resource. In some aspects, the second closed-loop TPC command is associated with a TPC accumulation for the non-full-duplex portion of the time-frequency resource.

In a tenth aspect, alone or in combination with one or more of the first through ninth aspects, the first transmit power configuration indicates a first resource position and a first transport format for the full-duplex portion, and the second transmit power configuration indicates a second resource position and a second transport format for the non-full-duplex portion. In an eleventh aspect, alone or in combination with one or more of the first through tenth aspects, the first transport format and the second transport format are a same transport format if a gain of a first target receive power of the first portion of the PUSCH communication, relative to a second target receive power of the second portion of the PUSCH communication, is expected to mitigate an interference-plus-noise power boost associated with full-duplex self-interference at a BS that is to receive the PUSCH communication.

In a twelfth aspect, alone or in combination with one or more of the first through tenth aspects, the first transport format and the second transport format are different transport formats if a gain of a first target receive power of the first portion of the PUSCH communication, relative to a second target receive power of the second portion of the PUSCH communication, is expected to not mitigate an interference-plus-noise power boost associated with full-duplex self-interference at a BS that is to receive the PUSCH communication. In a thirteenth aspect, alone or in combination with one or more of the first through tenth aspects, the first transport format and the second transport format are different transport formats if a first target receive power of the first portion of the PUSCH communication, and a second target receive power of the second portion of the PUSCH communication, are expected to be a same receive power.

In a fourteenth aspect, alone or in combination with one or more of the first through thirteenth aspects, process 500 further comprises transmitting a power headroom report that indicates at least one of a first power headroom value that is based at least in part on the first transmit power configuration, a second power headroom value that is based at least in part on the second transmit power configuration, or a third power headroom value that is based at least in part on the first transmit power configuration and the second transmit power configuration. In a fifteenth aspect, alone or in combination with one or more of the first through fourteenth aspects, the full-duplex portion is time division multiplexed with the non-full-duplex portion in the time-frequency resource.

In a sixteenth aspect, alone or in combination with one or more of the first through fifteenth aspects, process 500 further comprises determining the first transmit power, based at least in part on the first transmit power configuration, for an entire bandwidth of the PUSCH communication during the full-duplex portion, and determining the second transmit power, based at least in part on the second transmit power configuration, for the entire bandwidth of the PUSCH communication during the non-full-duplex portion.

In a seventeenth aspect, alone or in combination with one or more of the first through fourteenth aspects, the full-duplex portion is frequency division multiplexed with the non-full-duplex portion in the time-frequency resource. In an eighteenth aspect, alone or in combination with one or more of the first through seventeenth aspects, process 500 further comprises determining the first transmit power for one or more first resource blocks in which the PUSCH communication is to be transmitted in the full-duplex portion, determining the second transmit power for one or more second resource blocks in which the PUSCH communication is to be transmitted in the non-full-duplex portion, determining that a sum of the first transmit power and the second transmit power does not satisfy a transmit power threshold, and decreasing the first transmit power and the second transmit power, based at least in part on a common decreasing ratio, until the sum of the first transmit power and the second transmit power satisfies the transmit power threshold.

In a nineteenth aspect, alone or in combination with one or more of the first through seventeenth aspects, process 500 further comprises determining the first transmit power for one or more first resource blocks in which the PUSCH communication is to be transmitted in the full-duplex portion, determining the second transmit power for one or more second resource blocks in which the PUSCH communication is to be transmitted in the non-full-duplex portion, determining that a sum of the first transmit power and the second transmit power does not satisfy a transmit power threshold, decreasing the first transmit power until the sum of the first transmit power and the second transmit power satisfies the transmit power threshold or the first transmit power is zero, and decreasing, if the sum of the first transmit power and the second transmit power does not satisfy the transmit power threshold after decreasing the first transmit power to zero, the second transmit power until the sum of the first transmit power and the second transmit power satisfies the transmit power threshold.

In a twentieth aspect, alone or in combination with one or more of the first through nineteenth aspects, the full-duplex portion is time division multiplexed and frequency division multiplexed with the non-full-duplex portion in the time-frequency resource. In a twenty-first aspect, alone or in combination with one or more of the first through twentieth aspects, receiving the indication of the first transmit power configuration and the second transmit power configuration comprises receiving the indication of the first transmit power configuration and the second transmit power configuration in one or more signaling communications. In a twenty-second aspect, alone or in combination with one or more of the first through twenty-first aspects, the one or more signaling communications comprise an RRC communication, a MAC-CE communication, or a DCI communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
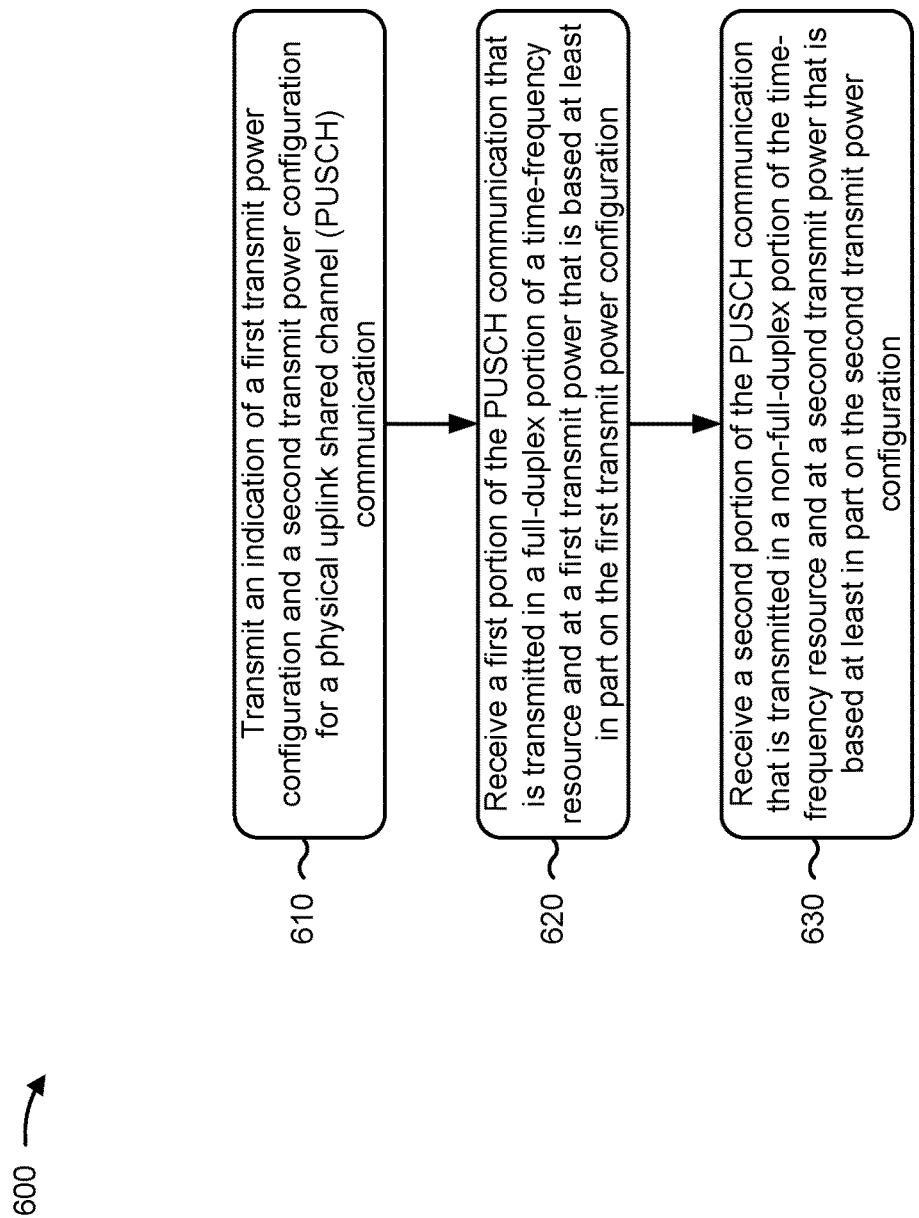
FIG. 6 is a diagram illustrating an example process performed, for example, by a base station (BS), in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110) performs operations associated with PUSCH transmit power configuration.

As shown in FIG. 6, in some aspects, process 600 may include transmitting an indication of a first transmit power configuration and a second transmit power configuration for a PUSCH communication (block 610). For example, the BS (e.g., using transmit processor 220, receive processor 238, controller/processor 240, memory 242, and/or the like) may transmit an indication of a first transmit power configuration and a second transmit power configuration for a PUSCH communication, as described above.

As further shown in FIG. 6, in some aspects, process 600 may include receiving a first portion of the PUSCH communication that is transmitted in a full-duplex portion of a time-frequency resource and at a first transmit power that is based at least in part on the first transmit power configuration (block 620). For example, the BS (e.g., using transmit processor 220, receive processor 238, controller/processor 240, memory 242, and/or the like) may receive a first portion of the PUSCH communication that is transmitted in a full-duplex portion of a time-frequency resource and at a first transmit power that is based at least in part on the first transmit power configuration, as described above.

As further shown in FIG. 6, in some aspects, process 600 may include receiving a second portion of the PUSCH communication that is transmitted in a non-full-duplex portion of the time-frequency resource and at a second transmit power that is based at least in part on the second transmit power configuration (block 630). For example, the BS (e.g., using transmit processor 220, receive processor 238, controller/processor 240, memory 242, and/or the like) may receive a second portion of the PUSCH communication that is transmitted in a non-full-duplex portion of the time-frequency resource and at a second transmit power that is based at least in part on the second transmit power configuration, as described above.

Process 600 may include additional aspects, such as any single implementation or any combination of aspects described below and/or in connection with one or more other processes described elsewhere herein.

In a first aspect, the first transmit power configuration indicates a first open-loop power control parameter and a first closed-loop TPC command, and the second transmit power configuration indicates a second open-loop power control parameter and a second closed-loop TPC command. In a second aspect, alone or in combination with the first aspect, the first open-loop power control parameter comprises at least one of a first target receive power or a first pathloss multiplier, and the second open-loop power control parameter comprises at least one of a second target receive power or a second pathloss multiplier. In a third aspect, alone or in combination with one or more of the first and second aspects, the first target receive power is greater relative to the second target receive power, and/or the first pathloss multiplier is greater relative to the second pathloss multiplier.

In a fourth aspect, alone or in combination with one or more of the first through third aspects, the first target receive power and the second target receive power are explicitly indicated. In a fifth aspect, alone or in combination with one or more of the first through third aspects, the second target receive power is explicitly indicated. In some aspects, the first target receive power is implicitly indicated relative to the second target receive power. In a sixth aspect, alone or in combination with one or more of the first through fifth aspects, a difference between the first target receive power and the second target receive power is based at least in part on a permitted interference power at another wireless communication device associated with the full-duplex portion.

In a seventh aspect, alone or in combination with one or more of the first through sixth aspects, a difference between the first target receive power and the second target receive power is based at least in part on a distance between a first wireless communication device and a second wireless communication device. In an eighth aspect, alone or in combination with one or more of the first through seventh aspects, the first closed-loop TPC command and the second closed-loop TPC command share a TPC accumulation for the time-frequency resource. In a ninth aspect, alone or in combination with one or more of the first through seventh aspects, the first closed-loop TPC command is associated with a TPC accumulation for the full-duplex portion of the time-frequency resource, and the second closed-loop TPC command is associated with a TPC accumulation for the non-full-duplex portion of the time-frequency resource.

In a tenth aspect, alone or in combination with one or more of the first through ninth aspects, the first transmit power configuration indicates a first resource position and a first transport format for the full-duplex portion, and the second transmit power configuration indicates a second resource position and a second transport format for the non-full-duplex portion. In an eleventh aspect, alone or in combination with one or more of the first through tenth aspects, the first transport format and the second transport format are a same transport format if a gain of a first target receive power of the first portion of the PUSCH communication, relative to a second target receive power of the second portion of the PUSCH communication, is expected to mitigate an interference-plus-noise power boost associated with full-duplex self-interference at the BS.

In a twelfth aspect, alone or in combination with one or more of the first through tenth aspects, the first transport format and the second transport format are different transport formats if a gain of a first target receive power of the first portion of the PUSCH communication, relative to a second target receive power of the second portion of the PUSCH communication, is expected to not mitigate an interference-plus-noise power boost associated with full-duplex self-interference at the BS. In a thirteenth aspect, alone or in combination with one or more of the first through tenth aspects, the first transport format and the second transport format are different transport formats if a first target receive power of the first portion of the PUSCH communication, and a second target receive power of the second portion of the PUSCH communication, is expected to be a same receive power.

In a fourteenth aspect, alone or in combination with one or more of the first through thirteenth aspects, process 600 further comprises receiving a power headroom report that indicates at least one of a power headroom value that is based at least in part on the first transmit power configuration, a second power headroom value that is based at least in part on the second transmit power configuration, or a third power headroom value that is based at least in part on the first transmit power configuration and the second transmit power configuration.

In a fifteenth aspect, alone or in combination with one or more of the first through fourteenth aspects, the full-duplex portion is time division multiplexed with the non-full-duplex portion in the time-frequency resource. In a sixteenth aspect, alone or in combination with one or more of the first through fourteenth aspects, the full-duplex portion is frequency division multiplexed with the non-full-duplex portion in the time-frequency resource. In a seventeenth aspect, alone or in combination with one or more of the first through fourteenth aspects, the full-duplex portion is time division multiplexed and frequency division multiplexed with the non-full-duplex portion in the time-frequency resource.

In an eighteenth aspect, alone or in combination with one or more of the first through seventeenth aspects, transmitting the indication of the first transmit power configuration and the second transmit power configuration comprises transmitting the indication of the first transmit power configuration and the second transmit power configuration in one or more signaling communications. In a nineteenth aspect, alone or in combination with one or more of the first through eighteenth aspects, the one or more signaling communications comprise an RRC communication, a MAC-CE communication, or a DCI communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
    receiving an indication of a first transmit power configuration and a second transmit power configuration for a physical uplink shared channel (PUSCH) communication;
    transmitting, using a first transmit power that is based at least in part on the first transmit power configuration, a first portion of the PUSCH communication in a full-duplex portion, of a time-frequency resource, wherein the first portion of the PUSCH communication occupies same resources as a Physical Downlink Shared Channel (PDSCH) communication of a network entity in the full-duplex portion; and
    transmitting, using a second transmit power that is based at least in part on the second transmit power configuration, a second portion of the PUSCH communication in a non-full-duplex portion, of the time-frequency resource, wherein a sum of the first transmit power and the second transmit power satisfies a transmit power threshold.

2. The method of claim 1, wherein the first transmit power configuration indicates a first open-loop power control parameter and a first closed-loop transmit power control (TPC) command; and
    wherein the second transmit power configuration indicates a second open-loop power control parameter and a second closed-loop TPC command.

3. The method of claim 2, wherein the first open-loop power control parameter comprises at least one of:
    a first target receive power, or
    a first pathloss multiplier; and
    wherein the second open-loop power control parameter comprises at least one of:
    a second target receive power, or
    a second pathloss multiplier.

4. The method of claim 3, wherein at least one of:
    the first target receive power is greater relative to the second target receive power, or
    the first pathloss multiplier is greater relative to the second pathloss multiplier.

5. The method of claim 3, wherein the first target receive power and the second target receive power are explicitly indicated, or
    wherein the second target receive power is explicitly indicated and the first target receive power is implicitly indicated relative to the second target receive power.

6. The method of claim 3, wherein a difference between the first target receive power and the second target receive power is based at least in part on at least one of:
    a permitted interference power at another wireless communication device associated with the full-duplex portion, or
    a distance between the wireless communication device and the other wireless communication device.

7. The method of claim 2, wherein the first closed-loop TPC command and the second closed-loop TPC command share a TPC accumulation for the time-frequency resource.

8. The method of claim 2, wherein the first closed-loop TPC command is associated with a TPC accumulation for the full-duplex portion of the time-frequency resource; and
    wherein the second closed-loop TPC command is associated with a TPC accumulation for the non-full-duplex portion of the time-frequency resource.

9. The method of claim 1, wherein the first transmit power configuration indicates a first resource position and a first transport format for the full-duplex portion; and
    wherein the second transmit power configuration indicates a second resource position and a second transport format for the non-full-duplex portion.

10. The method of claim 9, wherein the first transport format and the second transport format are a same transport format if a gain of a first target receive power of the first portion of the PUSCH communication, relative to a second target receive power of the second portion of the PUSCH communication, is expected to mitigate an interference-plus-noise power boost associated with full-duplex self-interference at a base station (BS) that is to receive the PUSCH communication.

11. The method of claim 9, wherein the first transport format and the second transport format are different transport formats if at least one of:
    a gain of a first target receive power of the first portion of the PUSCH communication, relative to a second target receive power of the second portion of the PUSCH communication, is expected to not mitigate an interference-plus-noise power boost associated with full-duplex self-interference at a base station (BS) that is to receive the PUSCH communication, or
    the first target receive power and the second target receive power are expected to be a same receive power.

12. The method of claim 1, further comprising:
    transmitting a power headroom report that indicates at least one of:
    a first power headroom value that is based at least in part on the first transmit power configuration,
    a second power headroom value that is based at least in part on the second transmit power configuration, or
    a third power headroom value that is based at least in part on the first transmit power configuration and the second transmit power configuration.

13. The method of claim 1, wherein at least one of:
    the full-duplex portion is time division multiplexed with the non-full-duplex portion in the time-frequency resource, or
    the full-duplex portion is frequency division multiplexed with the non-full-duplex portion in the time-frequency resource.

14. The method of claim 1, further comprising:
    determining the first transmit power, based at least in part on the first transmit power configuration, for an entire bandwidth of the PUSCH communication during the full-duplex portion; and
    determining the second transmit power, based at least in part on the second transmit power configuration, for the entire bandwidth of the PUSCH communication during the non-full-duplex portion.

15. The method of claim 1, further comprising:
    determining the first transmit power for one or more first resource blocks in which the PUSCH communication is to be transmitted in the full-duplex portion;
    determining the second transmit power for one or more second resource blocks in which the PUSCH communication is to be transmitted in the non-full-duplex portion;

determining that the sum of the first transmit power and the second transmit power does not satisfy the transmit power threshold; and
decreasing the first transmit power and the second transmit power, based at least in part on a common decreasing ratio, until the sum of the first transmit power and the second transmit power satisfies the transmit power threshold.

16. The method of claim 1, further comprising:
determining the first transmit power for one or more first resource blocks in which the PUSCH communication is to be transmitted in the full-duplex portion;
determining the second transmit power for one or more second resource blocks in which the PUSCH communication is to be transmitted in the non-full-duplex portion;
determining that the sum of the first transmit power and the second transmit power does not satisfy the transmit power threshold;
decreasing the first transmit power until:
the sum of the first transmit power and the second transmit power satisfies the transmit power threshold, or
the first transmit power is zero; and
decreasing, if the sum of the first transmit power and the second transmit power does not satisfy the transmit power threshold after decreasing the first transmit power to zero, the second transmit power until the sum of the first transmit power and the second transmit power satisfies the transmit power threshold.

17. The method of claim 1, wherein receiving the indication of the first transmit power configuration and the second transmit power configuration comprises:
receiving the indication of the first transmit power configuration and the second transmit power configuration in one or more signaling communications.

18. A method of wireless communication performed by a network entity, comprising:
transmitting an indication of a first transmit power configuration and a second transmit power configuration for a physical uplink shared channel (PUSCH) communication;
receiving a first portion of the PUSCH communication that is transmitted in a full-duplex portion of a time-frequency resource and at a first transmit power that is based at least in part on the first transmit power configuration, wherein the first portion of the PUSCH communication occupies same resources as a Physical Downlink Shared Channel (PDSCH) communication of the network entity in the full-duplex portion; and
receiving a second portion of the PUSCH communication that is transmitted in a non-full-duplex portion of the time-frequency resource and at a second transmit power that is based at least in part on the second transmit power configuration, wherein a sum of the first transmit power and the second transmit power satisfies a transmit power threshold.

19. The method of claim 18, wherein the first transmit power configuration indicates a first open-loop power control parameter and a first closed-loop transmit power control (TPC) command; and
wherein the second transmit power configuration indicates a second open-loop power control parameter and a second closed-loop TPC command.

20. The method of claim 19, wherein the first open-loop power control parameter comprises at least one of:
a first target receive power, or
a first pathloss multiplier; and
wherein the second open-loop power control parameter comprises at least one of:
a second target receive power, or
a second pathloss multiplier.

21. The method of claim 20, wherein at least one of:
the first target receive power is greater relative to the second target receive power; or
the first pathloss multiplier is greater relative to the second pathloss multiplier.

22. The method of claim 20, wherein the first target receive power and the second target receive power are explicitly indicated.

23. The method of claim 20, wherein the second target receive power is explicitly indicated; and
wherein the first target receive power is implicitly indicated relative to the second target receive power.

24. The method of claim 20, wherein a difference between the first target receive power and the second target receive power is based at least in part on at least one of:
a permitted interference power at another wireless communication device associated with the full-duplex portion, or
a distance between a first wireless communication device and a second wireless communication device.

25. The method of claim 19, wherein the first closed-loop TPC command and the second closed-loop TPC command share a TPC accumulation for the time-frequency resource.

26. The method of claim 19, wherein the first closed-loop TPC command is associated with a TPC accumulation for the full-duplex portion of the time-frequency resource; and
wherein the second closed-loop TPC command is associated with a TPC accumulation for the non-full-duplex portion of the time-frequency resource.

27. The method of claim 18, wherein the first transmit power configuration indicates a first resource position and a first transport format for the full-duplex portion; and
wherein the second transmit power configuration indicates a second resource position and a second transport format for the non-full-duplex portion.

28. The method of claim 27, wherein the first transport format and the second transport format are a same transport format if a gain of a first target receive power of the first portion of the PUSCH communication, relative to a second target receive power of the second portion of the PUSCH communication, is expected to mitigate an interference-plus-noise power boost associated with full-duplex self-interference at the network entity.

29. The method of claim 27, wherein the first transport format and the second transport format are different transport formats if at least one of:
a gain of a first target receive power of the first portion of the PUSCH communication, relative to a second target receive power of the second portion of the PUSCH communication, is expected to not mitigate an interference-plus-noise power boost associated with full-duplex self-interference at the network entity, or
the first target receive power of the first portion of the PUSCH communication, and the second target receive power of the second portion of the PUSCH communication, are expected to be a same receive power.

30. The method of claim 18, further comprising:
receiving a power headroom report that indicates at least one of:
a power headroom value that is based at least in part on the first transmit power configuration, a second power headroom value that is based at least in part on the second transmit power configuration, or a third power headroom value that is based at least in part on the first transmit power configuration and the second transmit power configuration.

31. The method of claim 18, wherein the full-duplex portion is at least one of time division multiplexed with the non-full-duplex portion in the time-frequency resource or frequency division multiplexed with the non-full-duplex portion in the time-frequency resource.

32. The method of claim 18, wherein transmitting the indication of the first transmit power configuration and the second transmit power configuration comprises:

transmitting the indication of the first transmit power configuration and the second transmit power configuration in one or more signaling communications.

33. A wireless communication device for wireless communication, comprising:

a memory; and one or more processors, coupled to the memory, configured to:

receive an indication of a first transmit power configuration and a second transmit power configuration for a physical uplink shared channel (PUSCH) communication;

transmit, using a first transmit power that is based at least in part on the first transmit power configuration, a first portion of the PUSCH communication in a full-duplex portion of a time-frequency resource, wherein the first portion of the PUSCH communication occupies same resources as a Physical Downlink Shared Channel PDSCH) communication of a network entity in the full-duplex portion; and transmit, using a second transmit power that is based at least in part on the second transmit power configuration, a second portion of the PUSCH communication in a non-full-duplex portion of the time-frequency resource, wherein a sum of the first transmit power and the second transmit power satisfies a transmit power threshold.

34. A non-transitory computer-readable medium storing one or more instructions for wireless communication, the one or more instructions comprising:

one or more instructions that, when executed by one or more processors of a wireless communication device, cause the one or more processors to:

receive an indication of a first transmit power configuration and a second transmit power configuration for a physical uplink shared channel (PUSCH) communication;

transmit, using a first transmit power that is based at least in part on the first transmit power configuration, a first portion of the PUSCH communication in a full-duplex portion of a time-frequency resource, wherein the first portion of the PUSCH communication occupies same resources as a Physical Downlink Shared Channel (PDSCH) communication of a network entity in the full-duplex portion; and transmit, using a second transmit power that is based at least in part on the second transmit power configuration, a second portion of the PUSCH communication in a non-full-duplex portion of the time-frequency resource, wherein a sum of the first transmit power and the second transmit power satisfies a transmit power threshold.

35. A network entity for wireless communication, comprising:

a memory; and one or more processors, coupled to the memory, configured to:

transmit an indication of a first transmit power configuration and a second transmit power configuration for a physical uplink shared channel (PUSCH) communication;

receive a first portion of the PUSCH communication that is transmitted in a full-duplex portion of a time-frequency resource and at a first transmit power that is based at least in part on the first transmit power configuration, wherein the first portion of the PUSCH communication occupies same resources as a Physical Downlink Shared Channel (PDSCH) communication of the network entity in the full-duplex portion; and receive a second portion of the PUSCH communication that is transmitted in a non-full-duplex portion of the time-frequency resource and at a second transmit power that is based at least in part on the second transmit power configuration, wherein a sum of the first transmit power and the second transmit power satisfies a transmit power threshold.

36. The wireless communication device of claim 33, wherein the one or more processors are further configured to:

determine the first transmit power for one or more first resource blocks in which the PUSCH communication is to be transmitted in the full-duplex portion;

determine the second transmit power for one or more second resource blocks in which the PUSCH communication is to be transmitted in the non-full-duplex portion;

determine that the sum of the first transmit power and the second transmit power does not satisfy the transmit power threshold; and decrease the first transmit power and the second transmit power, based at least in part on a common decreasing ratio, until the sum of the first transmit power and the second transmit power satisfies the transmit power threshold.

* * * * *